United States Patent [19]

Sorensen et al.

[11] Patent Number: 5,693,282

[45] Date of Patent: Dec. 2, 1997

[54] REMOVAL OF INJECTION MOLDED CABLE TIE BY IMPARTING GASEOUS STREAM TO PEEL STRAP FROM MOLD PART

[75] Inventors: Soren Christian Sorensen, Solana Beach; Jens Ole Sorensen, Rancho Santa Fe, both of Calif.

[73] Assignee: GB Electrical, Inc., Milwaukee, Wis.

[21] Appl. No.: 421,842

[22] Filed: Apr. 12, 1995

[51] Int. Cl.$^6$ .......................... B29C 45/43; B29C 45/44
[52] U.S. Cl. .......................... 264/297.2; 264/328.1; 264/334; 264/335
[58] Field of Search .......................... 264/334, 335, 264/328.1, 328.12, 328.7, 328.8, 318, 297.2; 425/129.1, 436 R, 437

[56] References Cited

U.S. PATENT DOCUMENTS

| | | | |
|---|---|---|---|
| 3,093,865 | 6/1963 | Peters et al. | |
| 3,159,878 | 12/1964 | Scott, Jr. et al. | |
| 3,537,676 | 11/1970 | Miller | 425/588 |
| 3,776,676 | 12/1973 | Kessler | 425/250 |
| 3,898,315 | 8/1975 | Haag | 264/334 |
| 4,076,483 | 2/1978 | Smirne | 425/444 |
| 4,238,106 | 12/1980 | Willingham | 249/79 |
| 4,354,995 | 10/1982 | Wiechard | 264/275 |
| 4,427,618 | 1/1984 | Sorensen | 264/328.9 |
| 4,432,127 | 2/1984 | Diazzi | 425/588 |
| 4,666,323 | 5/1987 | Kessler | 264/334 |
| 4,776,067 | 10/1988 | Sorensen | 24/16 PB |
| 4,880,687 | 11/1989 | Fichlseder et al. | 264/275 |
| 4,902,218 | 2/1990 | Leonard | 264/328.15 |
| 4,944,475 | 7/1990 | Oro et al. | 24/16 PB |
| 5,006,288 | 4/1991 | Rhodes, Jr. et al. | 264/275 |
| 5,028,225 | 7/1991 | Staheli | 425/588 |
| 5,053,179 | 10/1991 | Masui et al. | 264/275 |

FOREIGN PATENT DOCUMENTS

| | | |
|---|---|---|
| 1485656 | 2/1970 | Germany. |
| 1800861 | 5/1970 | Germany. |

*Primary Examiner*—Angela Y. Ortiz
*Attorney, Agent, or Firm*—Edward W. Callan

[57] ABSTRACT

An injection molded elongated article having a head and a strap, such as a cable tie, is ejected from between separated first and second mold parts by imparting a forceful gaseous stream between the mold parts to thereby peel a first portion of the strap from the first mold part after a second portion of the strap adjacent the head of the article was peeled from the first mold part by ejecting the head of the article from the first mold part while retaining the first portion of the strap in the first mold part. In a multi-cavity injection molding apparatus, a pair of nozzles are contained within each of a plurality of components through which compressed air flows into the region between the mold parts; and the nozzles are disposed closely adjacent the heads of a pair of cable ties for imparting a pair of gaseous streams from the component for peeling the first portions of the straps from the first mold part. In one embodiment, the nozzle-containing component is disposed within both the first mold part and the second mold part while the mold is closed and is at least partially disposed in the space between the first and second mold parts when the mold is open; and one of the mold parts includes a recess for receiving while the mold is closed the portion of the component that is at least partially disposed between the first and second mold parts when the mold is open.

11 Claims, 2 Drawing Sheets

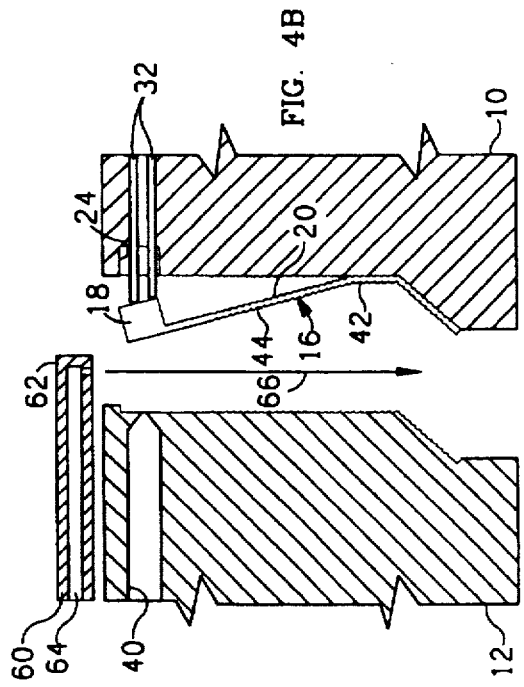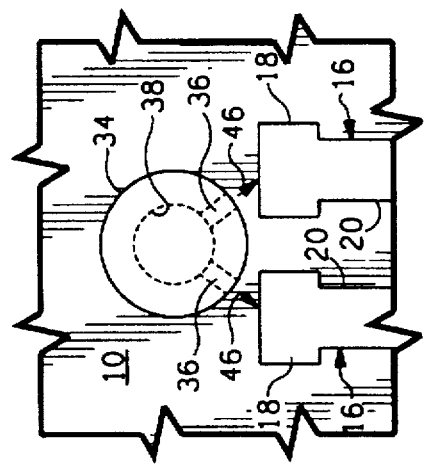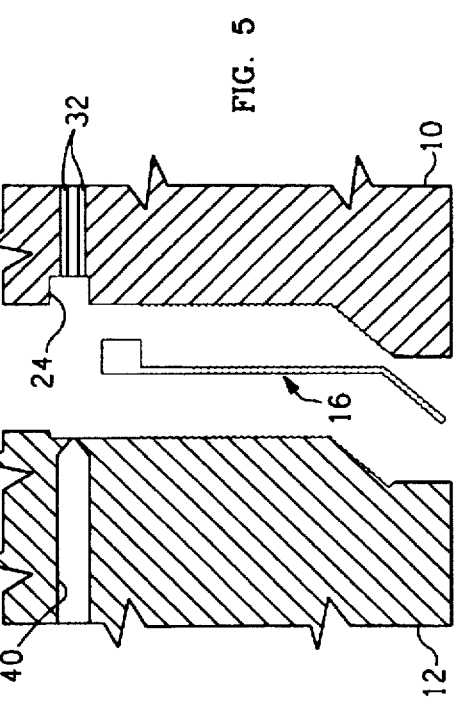

REMOVAL OF INJECTION MOLDED CABLE TIE BY IMPARTING GASEOUS STREAM TO PEEL STRAP FROM MOLD PART

BACKGROUND OF THE INVENTION

The present invention generally pertains to injection molding methods and is particularly directed to the step of ejecting one or more injection molded elongated articles, such as cable ties, from between the mold parts.

A cable tie is an elongated article having a head and an adjustable strap for bundling together articles such as cables or the like. Cable ties are also known as cable straps, cable clamps, cable clips, bundling ties, bundling straps, bundling clips, bundle ties, bundling belts, wire ties, ring clamps, adjustable clamps, harnessing devices, strap seals, binding straps, and ties. A typical cable tie includes an elongated strap with an adjacent locking head at one end of the strap, a tip at the opposite end of the strap and ratchet teeth on at least one side of the strap. The locking head defines an opening for allowing the tip end of the strap to be pulled through the opening and thereby form a closed loop around a bundle of articles. The locking head typically further includes a pawl having teeth with surfaces for engaging the ratchet teeth to lock the strap in the locking head after the tip end of the strap has been pulled through the opening. Examples of cable ties are described in U.S. Pat. Nos. 3,739,429, 3,924,299, 3,965,538, 4,473,524, 4,573,242 and 5,389,330.

Cable ties are manufactured economically by a cyclic injection molding method, in which fluid plastic material, such molten plastic material, is injected into a mold cavity defining the cable tie and then allowed to solidify within the mold cavity. The mold parts defining the mold cavity are then separated and the cable tie is ejected, first from the mold parts and then from the space between the mold parts.

It is known to eject an article from the space between the mold parts by imparting against the article a forceful gaseous stream, such as air, directed from a nozzle disposed closely adjacent the article when the article is ejected from the mold parts.

The ejection of an injection molded elongated article, such as a cable tie, from the space between the mold parts by imparting against the article a forceful gaseous stream directed from a nozzle disposed closely adjacent the head of a cable tie is described in U.S. Pat. No. 5,372,773. Such patent describes a method of injection molding a cable tie having a head and a strap, that includes the steps of (a) forming the cable tie by injecting molten plastic material into a mold cavity defined between a first mold part and a second mold part, wherein the first mold part includes a head region defining a portion of the head of the cable tie: (b) separating the first mold part and the second mold part while retaining said portion of the head of the cable tie in the head region of the first mold part, wherein such separation initially causes all but a small portion of the strap adjacent the head to be peeled from the first mold part while the free end of the strap is retained in the second mold part and ultimately causes the entire strap to be removed from the second mold part; (c) ejecting the head of the cable tie from the first mold part to thereby also remove the remainder of the strap from the first mold part; (d) protracting a nozzle from the first mold part to be closely adjacent the ejected head of the cable tie; and (e) ejecting the cable tie from between the first and second mold parts by imparting against the ejected head of the cable tie a forceful gaseous stream directed from the nozzle.

SUMMARY OF THE INVENTION

The present invention provides a method of injection molding an elongated article having a head and a strap the method comprising the steps of (a) forming the elongated article by injecting fluid plastic material into a mold cavity defined between a first mold part and a second mold part; (b) separating the first mold part and the second mold part; (c) while retaining at least a first portion of the strap of the elongated article in the first mold part, ejecting the head of the elongated article from the first mold part to thereby peel a second portion of the strap of the elongated article from the first mold part; and (d) ejecting the elongated article from between the first and second mold parts by imparting a forceful gaseous stream between the first mold part and the second mold part to thereby peel the first portion of the strap from the first mold part.

Additional features and advantages of the present invention are described in relation to the description of the preferred embodiment.

BRIEF DESCRIPTION OF THE DRAWING

FIG. 4A is a sectional view of an alternative embodiment to that shown in FIG. 4, with a nozzle that is attached to the second mold part so as to be received in a recess in the first mold part when the mold is closed and being disposed when the mold parts are separated so as to impart a gaseous stream between the cable tie and the first mold part.

FIG. 4B is a sectional view of an alternative embodiment to those shown in FIGS. 4 and 4A, with a nozzle disposed when the mold parts are separated so as to impart a gaseous stream between the cable tie and the second mold part.

FIG. 5 is a sectional view of the mold apparatus of FIGS. 1, 2, 3 and 4, 4A or 4B, with the cable tie being ejected from between the mold parts by a forceful fluid stream after the remainder of the strap is peeled from the first mold part by the gaseous stream imparted from the nozzle in either of the embodiments shown In FIGS. 4, 4A or 4B.

FIG. 6 is a partial plan view taken along line 6—6 of FIG. 4 showing a component containing a pair of nozzles disposed for imparting gaseous streams upon the heads of a pair of cable ties.

DETAILED DESCRIPTION

Figure 1:
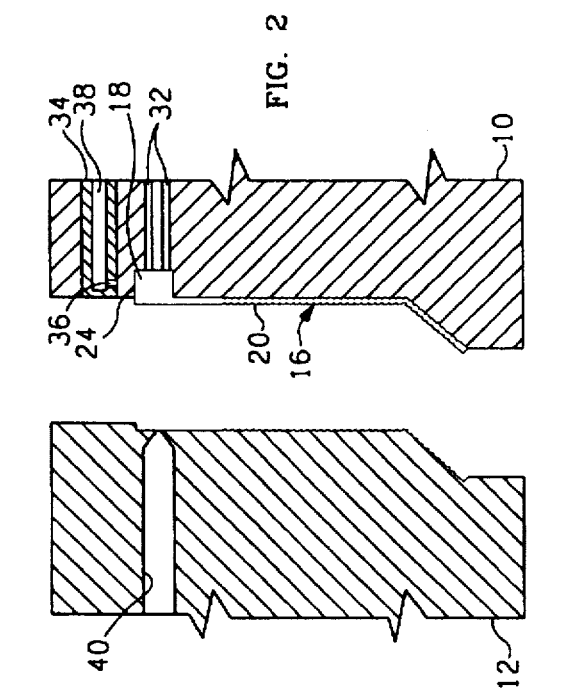
FIG. 1 is a sectional view of a mold apparatus used in a preferred embodiment of the method of the present invention, with first and second mold parts combined to define a mold cavity for forming a cable tie.

Referring to FIG. 1, an injection molding apparatus used in a preferred embodiment of the present invention Includes a first mold part 10 and a second mold part 12. The first mold part 10 is combined with the second mold part 12 to define a mold cavity 14 for forming a cable tie 16. The cable tie 16 has a head 18 and a strap 20 terminating in a tip 22 for passing through the head 18. The portion of the mold cavity 14 defined by the first mold part 12 defines a first series of teeth 21 on one side of the strap 20 and the portion of the mold cavity 14 defined by the second mold part 12 defines a second series of teeth 23 on the other side of the strap 20.

The first mold part 10 Includes a head region 24 defining a major portion of the head 18 of the cable tie; and the second mold part 12 includes a tip region 26 defining a portion of the tip 22 of the cable tie. The tip region 26 extends at an angle from a portion 28 of the mold cavity 14 defining most of the strap 20, with said extension being directed away from the bulk of the first mold part 10.

The first mold part 10 further includes a pair of protractable ejector pins 32 and a protractable component 34 containing a nozzle 36 and an air passage 38 that communicates with a source of compressed air (not shown). The ejector pins 32 are disposed to penetrate the head region 24 from within the first mold part 10, when the ejector pins 32 are protracted. In an alternative embodiment (not shown), the protractable component 34 is included in the second mold part 12 instead of the first mold part 10.

The second mold part 12 includes a runner system 40, through which molten plastic material, such as Nylon 6.6, is injected into the mold cavity 14 to form the cable tie 16.

Figure 2:
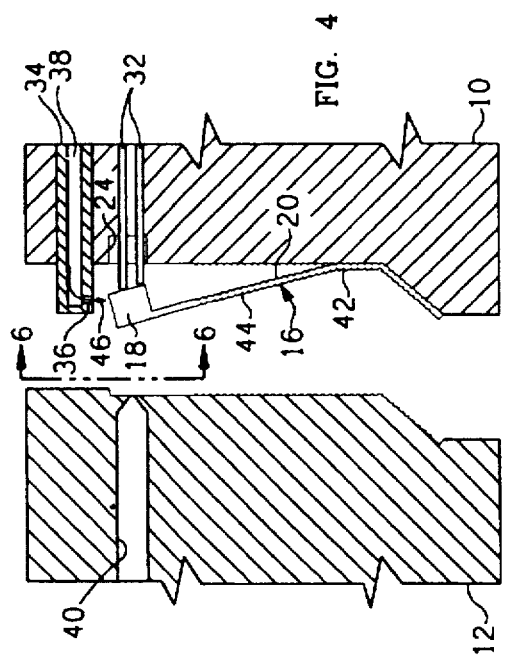
FIG. 2 is a sectional view of the mold apparatus of FIG. 1, with the mold parts separated and the cable tie removed from the second mold part.

Referring to FIG. 2, the first mold part 10 and the second mold part 12 are separated from one another with the molded cable tie 16 being retained in the first mold part 10.

Figure 3:
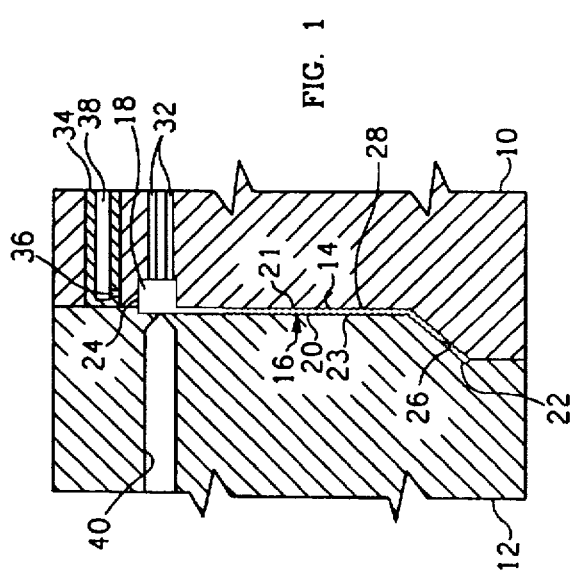
FIG. 3 is a sectional view of the mold apparatus of FIGS. 1 and 2, with the head of the cable tie being ejected from the first mold part and a portion of the strap of the cable tie being peeled away from the first mold part.

Referring to FIG. 3, while retaining at least a first portion 42 of the strap 20 in the first mold part 10, the ejector pins 32 are protracted to eject the head 18 of the cable tie 16 from the head region 24 of the first mold part 10 by pushing on the head 18 with the ejector pins 32 to thereby peel a second portion 44 of the strap 20 from the first mold part 10.

Figure 4:
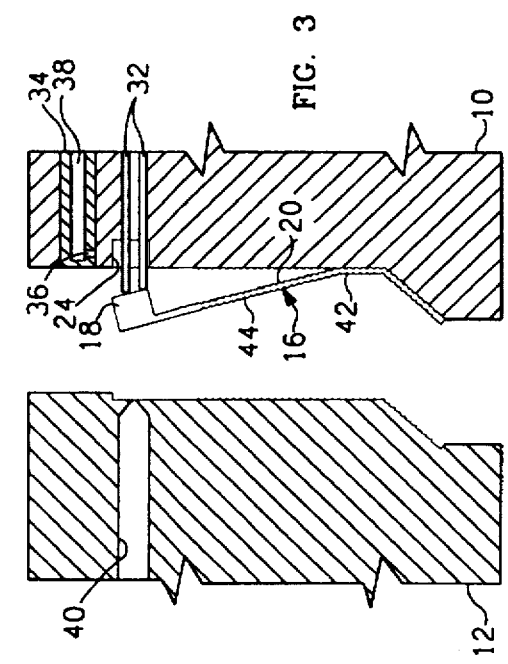
FIG. 4 is a sectional view of the mold apparatus of FIGS. 1, 2 and 3, with a nozzle protracted from the first mold part into a position for imparting a gaseous stream upon the head of the cable tie.

Referring to FIG. 4, the ejector pins 32 remain in their protracted position and the component 34 is protracted to position the nozzle 36 in the space between the first and second mold parts closely adjacent the head 18. A forceful stream of air (as represented by arrow 46) is then imparted on the head 18 from the nozzle 36 to thereby peel the first portion 42 of the strap 20 from the first mold part 10, whereupon the cable tie 16 is quickly ejected by the forceful stream of air from between the first and second mold parts 10, 12, as shown in FIG. 5.

Alternatively, the nozzle 36 can be so disposed that the forceful stream of air 46 is imparted to flow either between the second portion 44 of the strap 20 and the first mold part 10 or between the second portion 44 of the strap 20 and the second mold part 12; and in either case the forceful stream of air 46 peels the first portion 42 of the strap from the first mold part 10 and then quickly ejects the fully separated cable tie 16 from between the first and second mold parts 10, 12.

The stream of air 46 from the nozzle 36 also cools the head 18 of the cable tie 16 so that the cable tie can be ejected at an earlier time in the overall cycle.

The preferred embodiment of the present invention obviates the need for ejector pins along most of the length of the mold cavity 14 and thereby prevents distortion by ejectors pins of the teeth 21 on the one side of the strap 20. In an alternative embodiment, ejector pins are disposed along the full length of the strap 20 to aid in the removal of the strap 20 from either or both of the left and right mold parts 10, 12.

In an alternative embodiment shown in FIG. 4A, the second mold part 12 includes a component 50 containing a nozzle 52 and an air passage 54 that communicates with a source of compressed air (not shown). The component 50 is so attached to the second mold part 12 that separation of the first mold part 10 and the second mold part 12, as shown in FIG. 4A, causes the component 50 to be at least partially disposed in the space between the first and second mold parts 10, 12 so that the nozzle 52 is positioned closely adjacent the head 18 of the cable tie 16 when the head 18 occupies the position to which it is ejected from the first mold part 10 by the ejector pins 32. The first mold part 10 includes a recess 56 for receiving while the mold is closed the portion of the component 50 that is at least partially disposed between the first and second mold parts 10, 12 when the mold is open during ejection of the cable tie 16 from between the first and second mold parts.

The portion of the component 50 that is at least partially disposed between the first and second mold parts 10, 12 when the mold is open has a lateral dimension that diminishes in a direction toward the first mold part 10; and the recess 56 is so dimensioned that when such portion of the component 50 is received in the recess 56 the plastic material injected while the mold is closed is inhibited from entering the nozzle 52.

In an alternative embodiment (not shown), the component 50 is included in the first mold part 10 instead of the second mold part 12 and the recess 56 is included in the second mold part 12 instead of the first mold part 10.

The nozzle 52 is so disposed that when the first mold part 10 is separated from the second mold part 12 the forceful stream of air 58 (as represented by arrows 58) flows between the second portion 44 of the strap 20 and the first mold part 10. The forceful stream of air 58 is then imparted between the second portion 44 of the strap 20 and the first mold part 10 to thereby peel the first portion 42 of the strap 20 from the first mold part 10, whereupon the cable tie 16 is quickly ejected by the forceful stream of air from between the first and second mold parts 10, 12, as shown in FIG. 5.

Alternatively, the nozzle 52 can be so disposed that the forceful stream of air 58 is imparted to flow either onto the head 18 of the cable tie 16 or between the second portion 44 of the strap 20 and the second mold part 12; and in either ease the forceful stream of air 58 peels the first portion 42 of the strap from the first mold part 10 and then quickly ejects the fully separated cable tie 16 from between the first and second mold parts 10, 12.

In another alternative embodiment shown in FIG. 4B, there is included a component 60 containing a nozzle 62 and an air passage 64 that communicates with a source of compressed air (not shown). The component 60 is not contained within either of the first or second mold parts 10, 12, but may be attached to either of the first and second mold parts 10, 12. The component 60 is so disposed that separation of the first mold part 10 from the second mold part 12, as shown in FIG. 4B, causes the nozzle 62 to be positioned closely adjacent the head 18 of the cable tie 16 when the head 18 is ejected from the first mold part 10 by the ejector pins 32.

The nozzle 62 is so disposed that when the first mold part 10 is separated from the second mold part 12 the forceful stream of air (as represented by arrow 66) flows between the second portion 44 of the strap 20 and the second mold part 12. The forceful stream of air 66 is then imparted between the second portion 44 of the strap 20 and the second mold part 12 to thereby peel the first portion 42 of the strap 20 from the first mold part 10, whereupon the cable tie 16 is quickly ejected by the forceful stream of air from between the first and second mold parts 10, 12, as shown in FIG. 5.

Alternatively, the nozzle 62 can be so disposed that the forceful stream of air 66 is imparted to flow either onto the head 18 of the cable tie 16 or between the second portion 44 of the strap 20 and the first mold part 10; and in either case the forceful stream of air 66 peels the first portion 42 of the strap from the first mold part 10 and then quickly ejects the fully separated cable tie 16 from between the first and second mold parts 10, 12.

The present invention preferably is used in multi-cavity injection molding apparatus, which includes a plurality of such single-cavity apparatus as described above, except it is preferred that at least a pair of nozzles 36, 52, 62 be contained within each of the components 34, 50, 60 through which the compressed air flows into the region between the first and second mold parts 10, 12 so as to reduce the required number of such components 34, 50, 60. For example, as shown in FIG. 6, the component 34 includes a pair of nozzles 36 disposed closely adjacent the heads 18 of a pair of cable ties 16 that have been ejected from the first mold part 10 for imparting a pair of gaseous streams 46 from the component 34 for peeling a pair of first portions 42 (FIG. 4) of a pair of straps 16 from the first mold part 10.

In an alternative multi-cavity embodiment (not shown) the first portions 42 of a plurality of straps 16 are peeled from the first mold part 10 by each forceful stream of air imparted from each of a plurality of nozzles.

The advantages specifically stated herein do not necessarily apply to every conceivable embodiment of the present invention. Further such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A method of injection molding an elongated article having a head and a strap, the method comprising the steps of (a) forming the elongated article by injecting fluid plastic material into a mold cavity defined between a first mold part and a second mold part;

(b) separating the first mold part and the second mold part;

(c) while retaining at least a first portion of the strap of the elongated article in the first mold part, ejecting the head of the elongated article from the first mold part to thereby peel a second portion of the strap of the elongated article from the first mold part; and (d) ejecting the elongated article from between the first and second mold parts by imparting a forceful gaseous stream between the first mold part and the second mold part to thereby peel the first portion of the strap from the first mold part.

2. A method according to claim 1, wherein step (d) comprises the step of:

(e) imparting said gaseous stream so as to flow between the second portion of the strap and the second mold part.

3. A method according to claim 1, wherein step (d) comprises the step of:

(e) imparting said gaseous stream from a nozzle contained within a component that is disposed within the first mold part or the second mold part during step (a) and is at least partially disposed in the space between the first and second mold parts prior to or during step (d).

4. A method according to claim 3, wherein the component is attached to one of the first mold part or the second mold part and the other of the first mold part and the second mold part includes a recess for receiving during step (a) the portion of the component that is at least partially disposed between the first mold part and the second mold part when the mold is open during step (d).

5. A method according to claim 4, wherein said portion of the component has a lateral dimension that diminishes in a direction toward the other mold part and the recess is dimensioned for receiving the component.

6. A method according to claim 5, wherein the recess is so dimensioned that when the component is received in the recess the plastic material injected during step (a) is inhibited from entering the nozzle.

7. A method according to claim 1, wherein the injected fluid plastic is molten.

8. A method according to claim 1, wherein the gaseous stream comprises air.

9. A method of injection molding a plurality of elongated articles, each having a head and a strap, the method comprising the steps of (a) forming the elongated articles by injecting molten plastic material into respective mold cavities defined between a first mold part and a second mold part;

(b) separating the first mold part and the second mold part;

(c) while retaining at least first portions of the straps of the elongated articles in the first mold part, ejecting the heads of the elongated articles from the first mold part to thereby peel second portions of the straps of the elongated articles from the first mold part; and (d) ejecting the elongated articles from between the first and second mold parts by imparting at least one forceful gaseous stream between the first mold part and the second mold part to thereby peel the first portions of the straps of the elongated articles from the first mold part.

10. A method according to claim 9, wherein as to at least one pair of the elongated articles, step (d) comprises the step of:

(e) imparting a pair of gaseous streams from a pair of nozzles contained in a component to thereby peel said first portions of the straps from the first mold part.

11. A method according to claim 10, wherein a plurality of said components are disposed within the first mold part or the second mold part during step (a) and are at least partially disposed in the space between the first and second mold parts prior to or during step (d); and wherein said components are attached to one of the first mold part or the second mold part and the other of the first mold part and the second mold part includes a plurality of recesses for receiving during step (a) the portions of the resective components that are at least partially disposed between the first mold part and the second mold part when the mold is open during step (d).

* * * * *